United States Patent
Terashi

(10) Patent No.: US 6,483,721 B2
(45) Date of Patent: Nov. 19, 2002

(54) RESONANT POWER CONVERTER

(75) Inventor: Hiroto Terashi, Tokyo (JP)

(73) Assignee: Densei-Lambda K.K. (JP)

( * ) Notice: Subject to any disclaimer, the term of this patent is extended or adjusted under 35 U.S.C. 154(b) by 0 days.

(21) Appl. No.: 09/772,453

(22) Filed: Jan. 29, 2001

(65) Prior Publication Data
US 2001/0021114 A1 Sep. 13, 2001

(30) Foreign Application Priority Data

Jan. 28, 2000 (JP) ........................................ 2000-020546
Jan. 28, 2000 (JP) ........................................ 2000-020548

(51) Int. Cl.[7] ............................................. H02M 3/335
(52) U.S. Cl. ..................... 363/17; 363/21.62; 363/21.03
(58) Field of Search ................................ 363/17, 21.02, 363/21.03

(56) References Cited

U.S. PATENT DOCUMENTS

| 4,814,962 | A | * | 3/1989 | Magalhaes et al. | ........... 363/16 |
| 4,857,822 | A | * | 8/1989 | Tabisz et al. | ............... 323/282 |
| 4,860,184 | A | * | 8/1989 | Tabisz et al. | .................. 363/17 |
| 4,931,716 | A | * | 6/1990 | Jovanovic et al. | .......... 323/285 |
| 5,159,541 | A | * | 10/1992 | Jain | ............................. 363/26 |
| 5,245,520 | A | * | 9/1993 | Imbertson | .................... 363/17 |
| 5,278,748 | A | | 1/1994 | Kitajima | ..................... 363/56 |
| 5,402,329 | A | * | 3/1995 | Wittenbreder, Jr. | .......... 363/16 |
| 5,438,497 | A | * | 8/1995 | Jain | ............................ 363/17 |
| 5,481,449 | A | | 1/1996 | Kheraluwala | ................. 363/17 |
| 5,734,563 | A | | 3/1998 | Shinada | ........................ 363/21 |
| 5,907,223 | A | * | 5/1999 | Gu et al. | ..................... 315/247 |
| 5,933,338 | A | | 8/1999 | Wallace | ........................ 363/61 |
| 5,991,167 | A | * | 11/1999 | Van Lerberghe | ............. 363/16 |
| 6,160,374 | A | * | 12/2000 | Hayes et al. | ................. 320/108 |
| 6,175,219 | B1 | * | 1/2001 | Inamura et al. | ............. 323/222 |

FOREIGN PATENT DOCUMENTS

| JP | 06141541 | 5/1994 |
| JP | 08066025 | 3/1996 |
| JP | 08317639 | 11/1996 |
| JP | 10136645 | 5/1998 |
| JP | 11069803 | 3/1999 |
| JP | 11136934 | 5/1999 |

* cited by examiner

Primary Examiner—Bao Q. Vu
(74) Attorney, Agent, or Firm—Marger Johnson & McCollom, P.C.

(57) ABSTRACT

A resonant power converter includes a DC power source 1, a pair of MOS-PETs 1 and 2 which are connected in series to the DC power source, a transformer Tr1 which is arranged at the subsequent stage of the MOS-FETs 1 and 2 and includes a primary coil and a secondary coil, a capacitor C4 is arranged in parallel with the secondary coil of the transformer Tr1 so that series resonance occurs between the leakage inductance of the transformer Tr1 and the capacitor C4. A current doubler rectifier circuit may be arranged in the subsequent stage of the capacitor C4. Further, a pair of switching elements for synchronous rectification may be provided in the subsequent stage of the capacitor C4 so that these switching elements are driven by drive signals responsive to a voltage generated across the resonance capacitor C4.

16 Claims, 15 Drawing Sheets t0~t1 t1~t2 t2~t3 t3~t4 t4~t5 t5~t6(t0)

RESONANT POWER CONVERTER

BACKGROUND OF THE INVENTION

1. Field of the Invention

This invention relates to a DC power converter (DC power supply), and more particularly to a resonant power converter which is capable of performing zero voltage switching (ZVS) with reduced noise.

2. Description of the Prior Art

In general, a 5 to 10 volt DC power converter is required to operate the semiconductor integrated circuits used in electrical and electronic equipment such as personal computers and AV equipment. In the prior art, as for such DC power converters, power converters using a switching regulator are employed. Such DC power converter using the switching regulator can be formed into a compact size rather than other types of DC power converters using series regulators and shunt regulators and the like. Further, such DC power converters have advantages in that power loss is small and energy conversion efficiency is high. Recently, in order to achieve even greater reductions in power loss, resonant switching converters which are capable of zero voltage switching (ZVS) have been proposed and put to practical use.

In this connection. FIG. 16 is a schematic view of the structure of a prior art resonant power converter which is formed into a full bridge type. As shown in the drawing, this resonant power converter 20 is equipped with a D power source E21, a bridge circuit composed of four MOS-FETs 21 to 24, and a transformer Tr21 which is arranged at the output side of such bridge circuit. In this structure, one end of a primary coil (winding) L21 of the transformer Tr21 is connected to the junction between the MOS-FETs 23, 24, and the other end thereof is connected to the junction between of the MOS-FETs 21, 22 via a resonance capacitor C21 and a resonance coil L24.

Further, the both ends of a secondary coil (winding) L22 of the transformer Tr21 are respectively connected to the anodes of diodes D21, D22, and the cathodes of the diodes D21, D22 are connected to a center tap of the secondary coil L22 via a choke coil L23 and a capacitor C22. Further, both ends of the capacitor C22 form output terminals for connection to a load RL.

In this arrangement, the MOS-PETs 21 to 24 are driven by drive pulses having roughly the same resonance frequency as the resonance circuit constituted from the resonance capacitor C21, the resonance coil L24 and the primary coil L21 of the transformer Tr21 so that alternate switching between a state in which the MOS-FETs 21, 24 are turned on and a state in which the MOS-FETs 22, 23 are turned on is carried out to generate a resonance current in the primary coil L21 of the transformer Tr21. With this result, the resonance current induces a current in the secondary coil L22 of the transformer T21, and therefore a regulated output voltage Vo is generated across the ends of the capacitor C22. Further, because the resonance current flows with a substantially sinusoidal waveform, zero voltage switching can be carried out, and this makes it possible to greatly reduce switching loss and generation of noise.

However, in the prior art resonant power converter, since the resonance caused between the resonance capacitor C21 and resonance coil L24 and the primary coil L21 of the transformer Tr21 is utilized, there is a problem in that the energizing current for the transformer Tr21 becomes too large, which results in large energy loss and an increased size of the transformer Tr21. Further, there is another problem in that this arrangement requires to have the center tap in the secondary coil L2 of the transformer Tr21, which results in complicated structure of the transformer Tr21.

In addition, in the prior art resonant power converter, since the diodes D21, D22 are used as the rectifying means, a large voltage drop occurs in these elements. Therefore, when such a power converter is configured into a large current and low voltage type power converter which is aL trend of the current power converters, the energy loss caused in the diodes becomes considerably large, which results in the factors that cause increased heat generation and decreased conversion efficiency of the circuit of the power converter. Namely, the prior art circuit configuration involves a problem which can not be applied to large current and low voltage type power converters.

SUMMARY OF THE INVENTION

The present invention has been made in view of the problems in the prior art described above, and therefore an object of the present invention is to provide a resonant power converter which does not need to provide a center tap in a transformer and has high energy conversion efficiency.

Another object of the present invention is to provide a resonant power converter utilizing synchronous rectification which can reduce energy loss in the rectifying means to improve energy conversion efficiency of the power converter.

In order to achieve these objects, the present invention is directed to a resonant power converter. The resonant power converter comprises an input power source provided in the primary side; switching means connected to the input power source: a resonant transformer having a primary coil and a second coil; and a resonance capacitor which is provided in the secondary aide and is connected in parallel to the secondary coil of the resonant transformer so that series resonance occurs it a current flowing through the secondary side of the power converter.

In the resonant power converter described above, because a resonance current flows between the resonance capacitor arranged on the secondary side of the resonant transformer and the leakage inductances of the resonant transformer, a resonance current will not flow through the primary coil of the transformer, and as a result, it is possible to reduce the excitation current of the transformer.

Further, because zero voltage switching can be carried out, it becomes possible to reduce power loss. Furthermore, because the switching timing of the primary side is not synchronized with the switching timing of the secondary side, the switching noise generated at the primary side and the switching noise generated at the secondary side are not superposed with each other, and this makes it possible to diffuse noise.

In the present invention, it is preferred that the resonant transformer is constructed from an ideal transformer and a resonant coil arranged in the primary side of the ideal transformer, so that the series resonance occurs between the resonant coil and the resonance capacitor.

Further, it is also preferred that the resonant transformer has a leakage inductance, and the series resonance of the current occurs between the leakage inductance and the resonance capacitor.

In the present invention, it is also preferred that the resonant power converter further comprises a current doubler circuit for making the current flowing through the secondary side double, said current doubler circuit being provided in the secondary side and coupled to the both ends of the resonance capacitor. In this case, it is preferred that the current doubler circuit includes a pair of circuits each having a rectifying means and an inductance, in which these circuits are connected in parallel with each other so that a junction between the rectifying means and inductance of one circuit and a junction between the rectifying means and the inductances are respectively connected to the both ends of the secondary coil of the transformer.

In the present invention, it is particularly preferred that the resonant power converter further comprises means for performing synchronous rectification for the current flowing the secondary side, said means including switching elements for synchronous rectification provided in the secondary side so as to be driven by drive signals responsive to the voltage generated across the resonance capacitor and having a sinusoidal waveform. In this case, it is preferred that said switching means includes a pair of switching elements, and these switching elements are driven by the drive signals.

According to this arrangement, since the voltage signal in the form of sinusoidal wave generated across the resonance capacitor is used to drive the switching elements for synchronous rectification to rectify the current flowing through the secondary side of the circuit, a voltage drop can be drastically reduced as compared with the conventional circuit using diodes and thereby it is possible to improve the energy conversion efficiency of the power converter remarkably. Further, there is no need to provide a separate drive circuit for driving the switching elements, the circuit configuration can be made simple and therefore manufacturing cost can be lowered.

In this arrangement, it is preferred that the resonant power converter further comprises a pair of auxiliary coils which are connected to the both ends of the secondary coil, respectively, and the drive signals are obtained from the opposite ends of the respective auxiliary coils which are not connected to the secondary coil. This makes it possible to amplify the drive signals generated at the resonance capacitor.

Further, it is also possible to further comprises waveform processing means for producing pulse waves by processing and shaping the voltage drive signals to be supplied to the switching elements. In this waveform processing means, the voltage drive signals in the form of sinusoidal wave are compared with a predetermined reference value to produce the plus signals.

Moreover, it is also preferred that the resonant transformer is composed of an ideal transformer and a resonant coil connected to the primary coil of the transformer, so that the series resonance occurs between the resonant coil and the resonance capacitor.

In the arrangements described above, a MOS-FET is preferably used as each of the switching elements.

These and other objects, structure and advantages of the present invention will be apparent from the following description of the preferred embodiments in conjunction with the appended drawings.

BRIEF DESCRIPTION OF THE DRAWINGS

FIGS. 2(a) and 2(b) are an equivalent circuit of the circuit shown in FIG. 1, in which FIG. 2(a) shows the flow of the current at the interval between time t0 and time t1, and FIG. 2(b) shows the flow of the current at the interval between time t1 and time t2.

DETAILED DESCRIPTION OF TEE PREFERRED EMBODIMENTS

Hereinafter, preferred embodiments of the present invention will be described with reference to the appended drawings.

Figure 1:
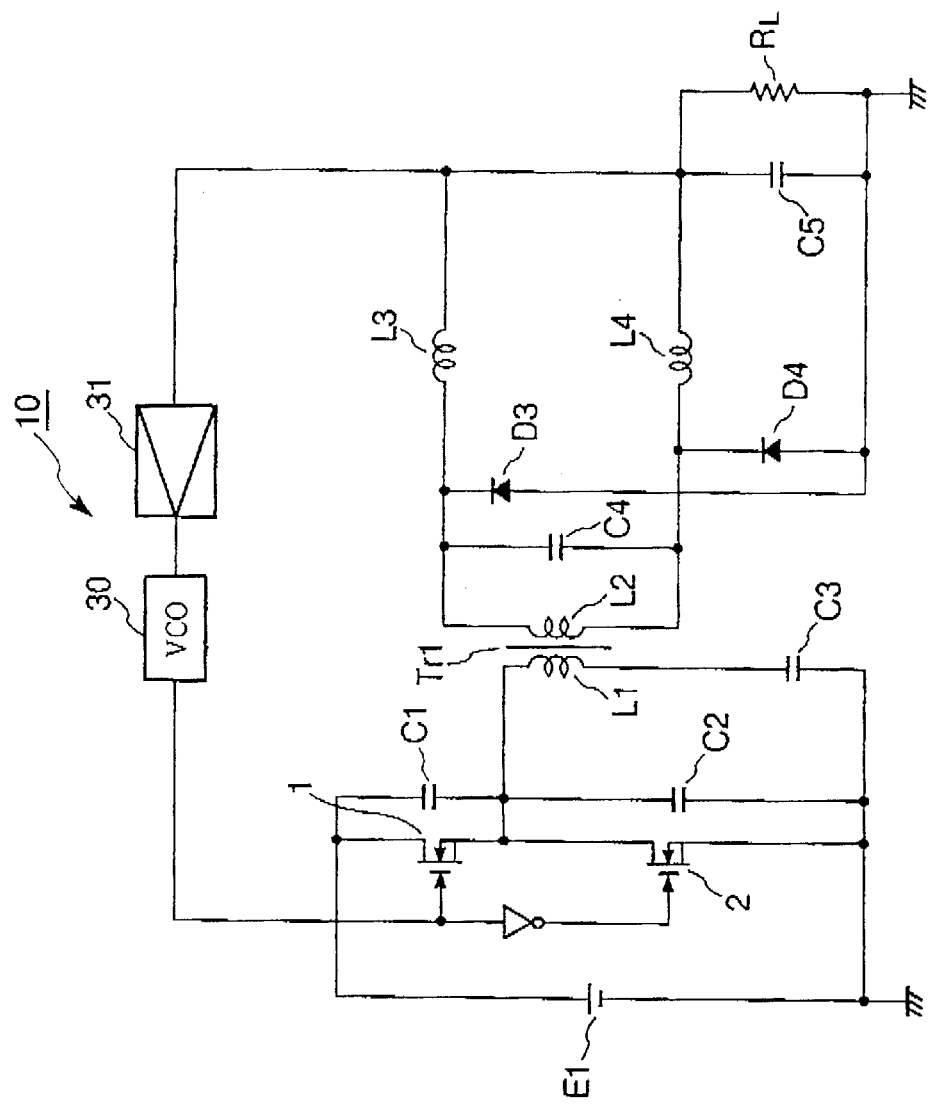
FIG. 1 is a circuit diagram which shows a first embodiment of a resonant power converter according to the present invention.

First, FIG. 1 is a circuit diagram showing the circuit configuration of a first embodiment of a resonant power converter according to the present invention. As shown in this circuit diagram, a resonant power converter 10 is equipped with a DC power source E1, two MOS-FETs 1, 2 (switching means) connected in series with respect to the DC power source E1, a voltage controlled oscillator (hereinafter, referred to-as a VCO) 30 for controlling the frequency of the driving signals supplied to the MOS-FETs 1, 2, a capacitor C1 connected in parallel with the MOS-FET 1, a capacitor C2 connected in parallel with the MOS-FET 2, and a transformer (resonant transformer) Tr1 which includes a primary coil (winding) L1 and a secondary coil (winding) L2. In this arrangement, one end of the primary coil L1 of the transformer Tr1 is connected to the junction between the MOS-FETs 1, 2, and the other end is connected to the negative side of the DC power source E1 via a capacitor C3.

The VCO 30 turns the two MOS-FETs 1, 2 on and off by means of drive signals adjustably outputted with the same frequency as or a higher frequency than the resonance frequency of a resonance circuit constituted from leakage inductances (L11, L12) and a resonance capacitor (C4) described below.

The resonance capacitor C4 is arranged at both ends of the secondary coil L2 of the transformer Tr1, and a current doubler circuit (current doubling circuit) which includes two diodes (rectifying means) D3, D4 and two choke coils L3, L4 (inductors) is also coupled to the ends of the secondary coil L2.

The current doubler circuit is constructed from a first series circuit which includes the diode D3 and the choke coil L3, and a second series circuit which includes the diode D4 and the choke coil L4, wherein these two series circuits are connected in a parallel arrangement. In this arrangement, the junction between the diode D3 and the choke coil L3 is connected to one end of the secondary coil L2 of the transformer Tr1, and the junction between the diode D4 and the choke coil L4 is connected to the other end of the secondary coil L2. Further, a capacitor C5 is arranged between the junction of the diodes D3, D4 and the junction of the choke coils L3, L4, and both ends of the capacitor C5 form output terminals for connection to a load RL.

In this arrangement, the voltage signals generated at the capacitor C5 are supplied to the VCO 30 via an amplifier 31.

Figure 2:
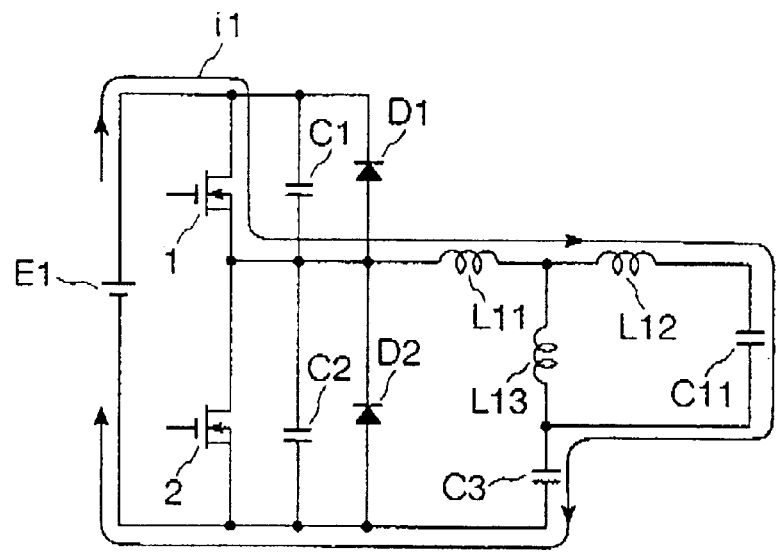
Figure 2:
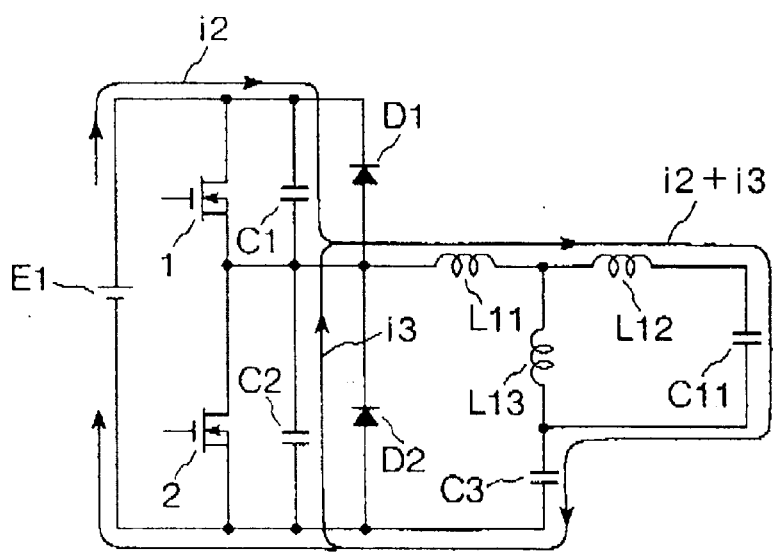
Figure 3:
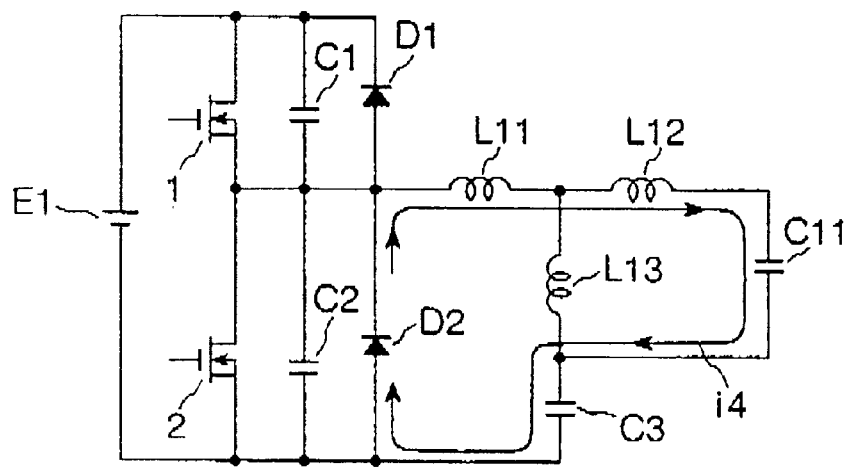
FIG. 3(a) shows the flow of the current at the interval between time t2 and time t3.
FIG. 3(b) shows the flow of the current at the interval between time t3 and time t4.
Figure 3:
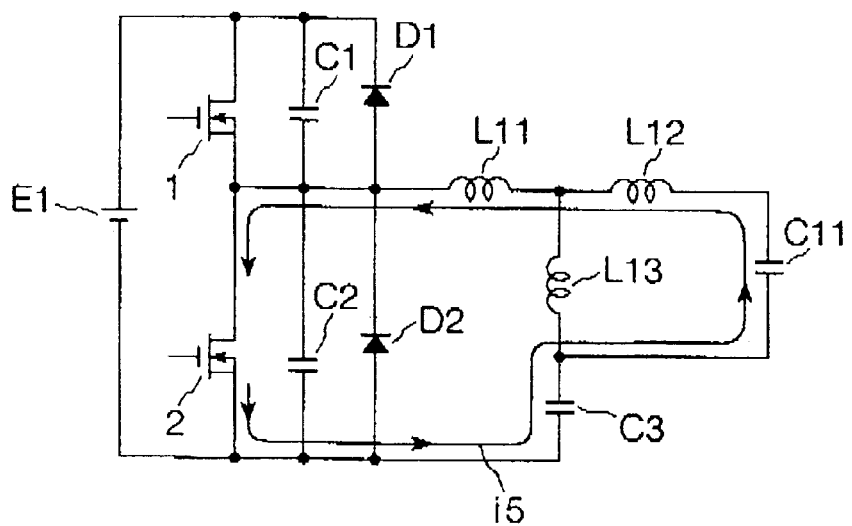
Figure 4:
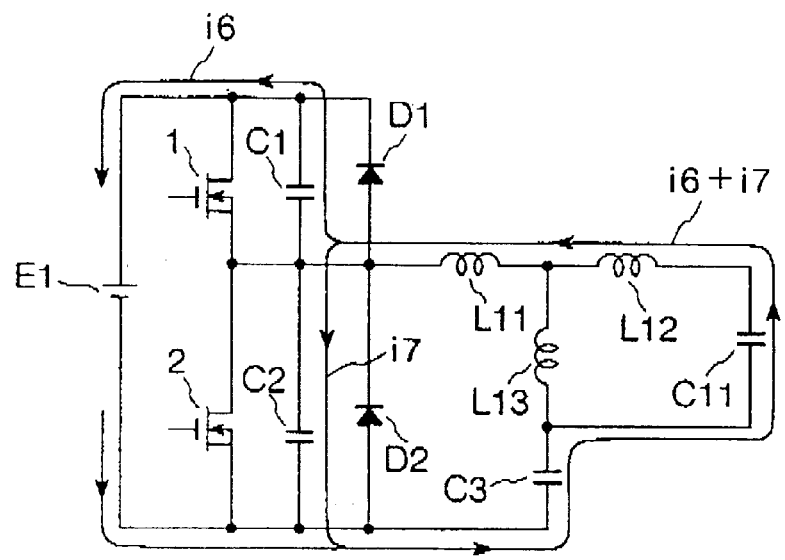
FIG. 4(a) shows the flows of the current at the interval between time t4 and time t5.
FIG. 4(b) shows the flow of the current at the interval between time t5 and time t0.
Figure 4:
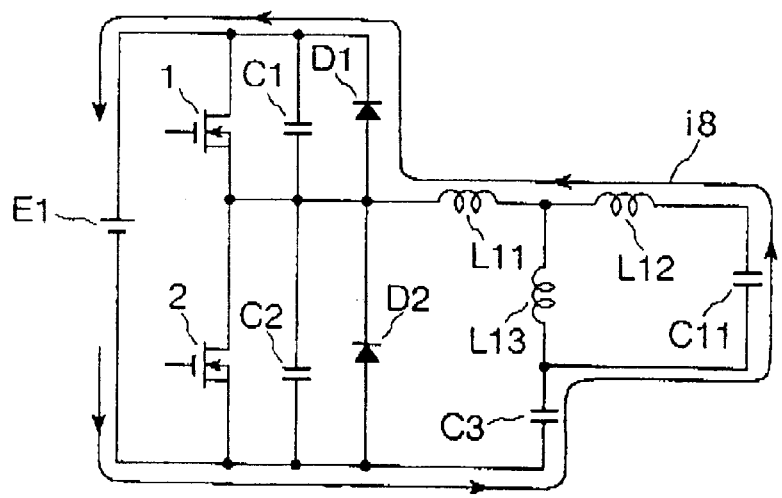

Next, the operation of the present embodiment will be described with reference to FIGS. 2 to 4 which respectively show an equivalent circuit diagram of the circuit configuration of the power converter shown in FIG. 1 (In this regard, because a constant-current circuit is formed on the secondary side of the transformer Tr1 by the provision of the choke coils L3, L4, only a portion of the circuit in the left-side of the capacitor C4 need to be considered), and FIG. 5 which shows a timing chart showing the operation of the circuit of this embodiment. Now, if the transformer Tr1 shown in FIG. 1 has a coupling coefficient K and a conversion is carried out for the primary side, then the transformer Tr1 can be represented by two leakage inductances L11, L12 (L11, L12=(1−K)×L1) and a main inductance L13 (L13= K×L1) connected in a T-shaped arrangement. Further, the resonance capacitor C4 shown in FIG. 1 can be represented by the capacitor C11 (C11=C4/$N^2$, where N is the winding ratio of the transformer Tr1). Furthermore, in FIGS. 2 to 4, D1 is a body diode for the MOS-FET 1 and D2 is a body diode for the MOS-FET 2.

In this connection, FIG. 5(a) shows the ON-OFF states of the MOS-FET 1, FIG. 5(b). shows the ON-OFF states of the MOS-FET 2, FIG. 5(c) shows the voltage across the MOS-FET 2, FIG. 5(d) shows a waveform of the current in the primary side, and FIG. 5(e) shows a waveform of the voltage in the secondary side.

Figure 5:
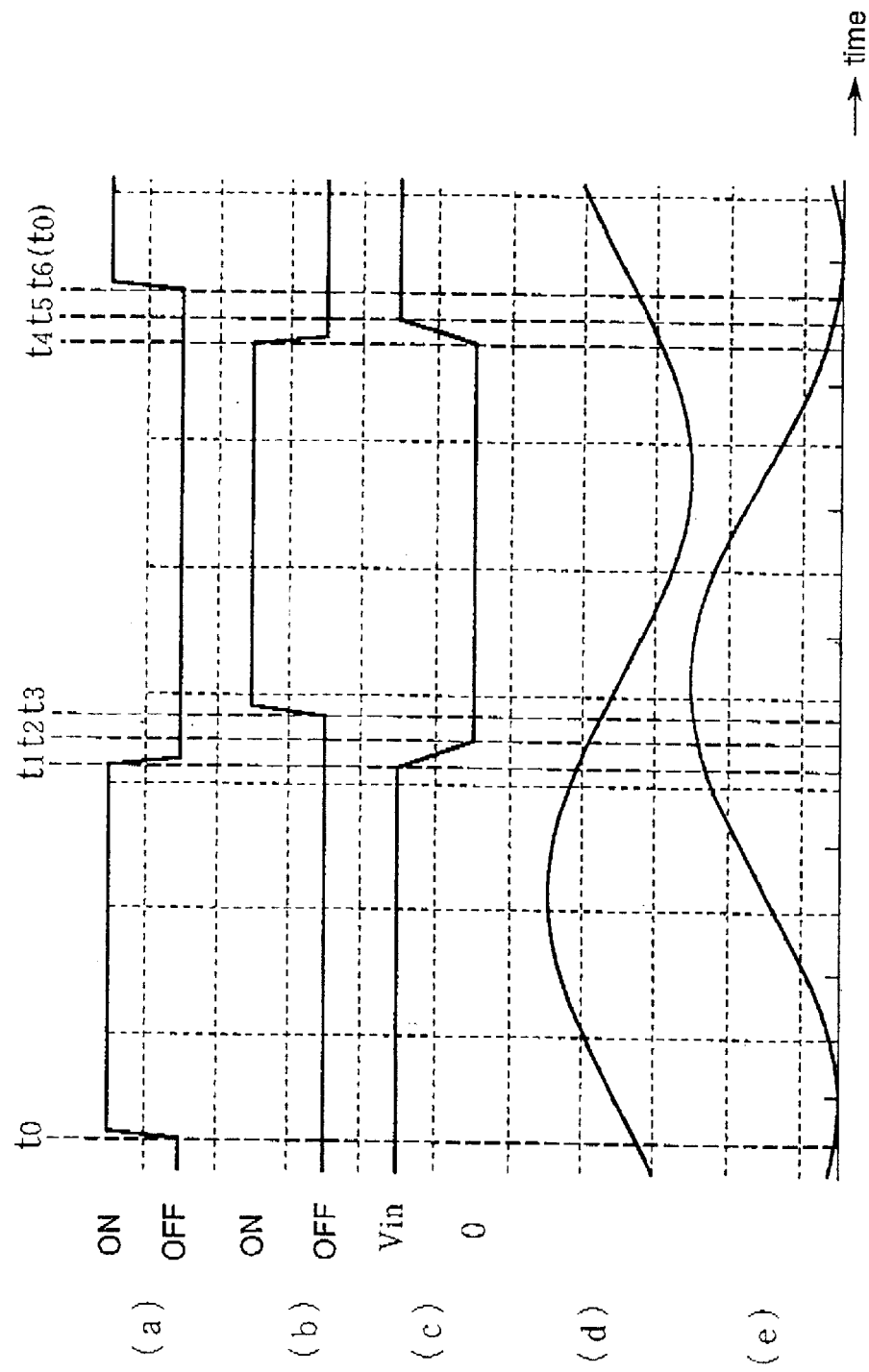
FIG. 5 is a timing chart showing the operation of the circuit of this embodiment, in which (a) shows ON/OFF states of MOS-FET 1, (b) shows ON/OFF states of MOS-PET 2, (c) shows the voltage across the MOS-FET 2, (d) shows a waveform of the current in the primary side, and (e) shows a waveform of the voltage in the secondary side.

As shown in FIG. 5, under the control by the VCO 30, drive signals like those shown in FIGS. 5(a) and (b), namely, drive signals which switch the MOS-FET 1 to an OFF state after the MOS-FET 1 has been in an ON state for a prescribed time, and drive signals which switch the MOS-FET 2 to an ON state after a predetermined delay from the time of point that the MOS-FET 1 has been in the OFF state are generated and outputted. (That is, the two MOS-FETs 1, 2 are never in an ON state at the same time). When these drive signals are given, the MOS-FET 1 is turned on at time t0 (at which time the MOS-FET 2 is in an OFF state), so that a resonance current i1 will flow from the positive side of the DC power supply E1 (where the voltage is $V_{in}$) to the negative side thereof via the MOS-FET 1, the leakage inductances L11, L12 and the capacitors C11, C3 as shown in FIG. 2(a). At this time, the capacitor C2 is charged by the resonant current to establish a voltage $V_{in}$ thereon, and as shown in FIG. 5(c), the voltage $V_{ds}$ (drain-to-source voltage) of the MOS-FET 2 is $V_{in}$ volts.

Then, since the MOS-FET 1 is turned off at time t1 (and at this time the MOS-FET 2 is also in an OFF state), the discharge current i3 of the capacitor C2 and the charging current i2 of the capacitor C1 flow as a resonance current as shown in FIG. 2(b). Then, when the voltage of the capacitor C2 becomes 0 at time t2, a resonance current i4 begins to flow via the body diode D2 as shown in FIG. 3(a). At this time, the voltage $V_{ds}$ of the MOS-FET 2 has become 0 volts. Therefore, if the NOS-FET 2 is switched to an ON state within the time interval between time t2 and time t3, it becomes possible to carry out zero voltage switching, and this makes it possible to reduce power loss.

Next, when the MOS-FET 2 is turned on at time t3, charge stored in the capacitor C3 is discharged, so that a resonance current i5 begins to flow via the MOS-FET 2. as shown in FIG. 3(b), in a direction opposite to those currents that flowed up to time t3. At this time, the capacitor C1 is charged by the resonance current to establish a voltage $V_{in}$ thereon. Then, when the MOS-FET 2 is turned off at time t4, the charge stored in the capacitor C1 is discharged, and this causes currents i6, i7 to flow as shown in FIG. 4(a), whereby the capacitor C2 is charged to establish a voltage $V_{in}$ thereon.

Further, as shown in FIG. 5(c), when the drain-to-source voltage $V_{ds}$ of the MOS-FET 2 becomes $V_{in}$ volts, a resonance current i8 begins to flow via the body diode D1 as shown in FIG. 4(b). At this time, because the voltage $V_{ds}$ of the MOS-FET 1 becomes 0 volts, it becomes possible to carry out zero voltage switching if the MOS-FET 1 is turned on within the time interval between time t5 and time t6(t0).

Then, when the MOS-FET 1 is switched to an ON state again, the operations described above with reference to FIGS. 2 to 4 are repeated, and this makes it possible to obtain a primary current having a sinusoidal waveform like that shown in FIG. 5(d), and a secondary voltage having a sinusoidal waveform like that shown in FIG. 5(e). As can be understood from these drawings, because the timing of the primary side switching is not synchronized with the timing of the secondary side switching, the switching noise generated at the primary side and the switching noise generated at the secondary side will not be superposed with each other, and this makes it possible to diffuse noise.

Further, because a resonance current continues to flow without interruption via the leakage inductances L11, L12, it is possible to prevent the generation of ringing noise in the secondary voltage waveform.

Figure 6:
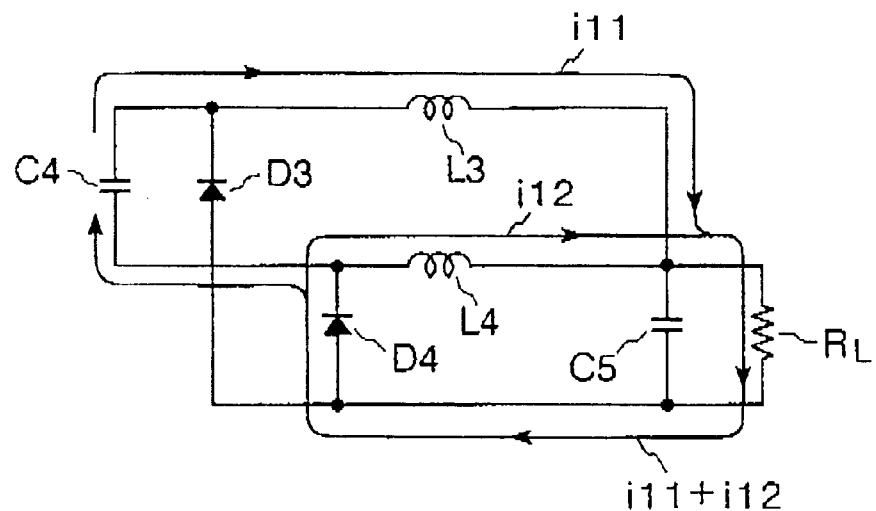
FIGS. 6(a) and 6(b) are a circuit diagram for explaining the flows of the current in the current doubler circuit in the resonant power converter of this embodiment, in which (a) shows a state of (+) input and (b) shows a state of (−) input.
Figure 6:
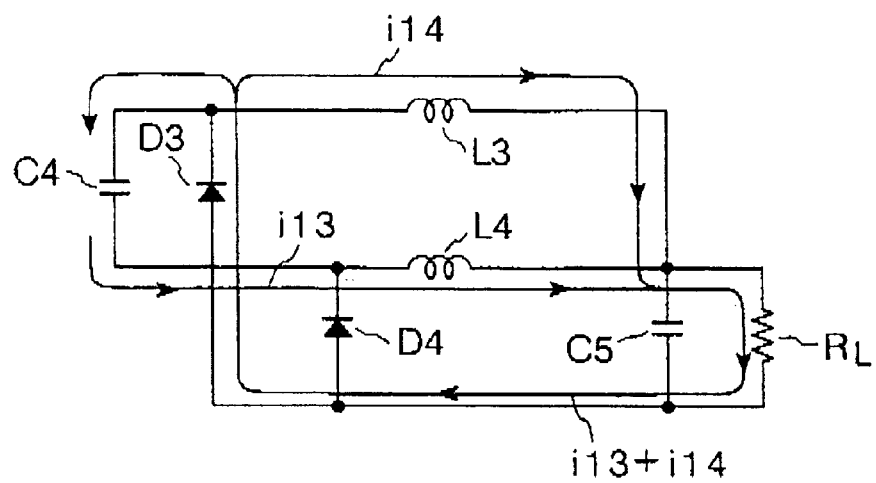

FIGS. 6(a) and (b) are circuit diagrams which show the operation of the current doubler circuit. Hereinbelow, the operation of a portion of the circuit which is the right side of the capacitor C4 shown in FIG. 1 will be described with reference to FIGS. 6(a) and 6(b). Now, in the case where the voltage of the capacitor C4 is positive, a current i11 flows via the choke coil L3, the capacitor C5 and the diode D4, and a loop current i12 flows via the capacitor C5, the diode D4 and the choke coil L4 as shown in FIG. 6(a). As a result, the current (i11+i12) flows through the load RL, whereby the value of the current is doubled.

Further, in the case where the voltage of the capacitor C4 is negative, a current i13 flows via the choke coil L4, the capacitor C5 and the diode D3, and a loop current i14 flows via the capacitor C5, the diode D3 and the choke coil L3 as shown in FIG. 6(b). As a result, the current (i13+i14) flows through the load RL, whereby the value of the current is doubled. At this time, because the current i13 and the current i14 have mutually symmetrical waveforms, the current (i13+i14) obtained by the addition of such currents creates a flat DC voltage. Namely, it is possible to achieve zero ripple. In this way, the capacity of the output capacitor C5 can be made small.

In the resonant power converter 10, the frequency of the drive signals supplied to each of the MOS-FETs 1, 2 can be changed under the control by the VCO 30. Then, by adjusting the frequency of the drive signals, it is possible to adjust the output voltage. For example, in the case where the frequency of the drive signals is raised, the impedance of the resonance circuit is increased, so that the voltage generated at the secondary side is reduced. In this way, it becomes possible to supply a regulated output voltage.

In the example described above, the diodes D3 and D4 are used as rectifying means, but it is also possible to use other means to carry out synchronous rectification of the current. For example, switching elements such as transistors (including MOS-FET) or thyristors can be used for carrying out synchronous rectification of the current.

As described above, in the resonant power converter according to the present embodiment, the resonance capacitor C4 is provided in the secondary side of the transformer Tr1 so that a resonance current is generated by utilizing the resonance phenomenon between the capacitor C4 and the leakage inductances (L11, L12) of the transformer Tr1. Therefore, the resonance current does not flow through the main inductance L13 (see FIG. 2), and thereby the excitation current of the transformer Tr1 does not increase. Accordingly the transformer Tr1 can be made more compact, and this makes it possible to lower manufacturing costs.

Further, a sinusoidal waveform voltage is generated across the resonance capacitor C4 provided in the secondary side. Therefore, if this voltage is utilized to drive switching elements (such as MOS-FETs, thyristors or the like which are used as rectifying means), it is possible to easily carry out synchronous rectification for the current flowing through the switching elements. Namely, when the voltage waveform (sinusoidal wave) generated across the capacitor C4 is used as drive signals, it is possible to drive the MOS-FETs using the drive signals. As a result, it is not necessary to provide a separate drive circuit for driving the MOS-FETs, thereby enabling to simplify the overall circuit structure. This will be discussed in more details with reference to the second embodiment described below.

Furthermore, because it is possible to achieve zero ripple, the capacity of the output capacitor C5 can be made small. Further, because the current flowing through the choke coils L3 and L4 is the same PC current, the magnetic fluxes passing (current flowing) through the central pole portion of the EI-core of each of the choke coils L3, L4 is reduced. This makes it possible to use an EI-core having a smaller central pole portion, thereby enabling to reduce the size of the choke coils.

Further, because the resonance current of the secondary side is supplied as a load current, it is possible to regulate the current value regardless of the load. Namely, even when the load fluctuates, a current larger than such resonance current does not flow. Therefore, even in the case where an overload happens at the output side, an excessive current flow will not occur, and operations are carried out to lower the power source voltage, thereby enabling to protect the circuit of the power converter.

Figure 7:
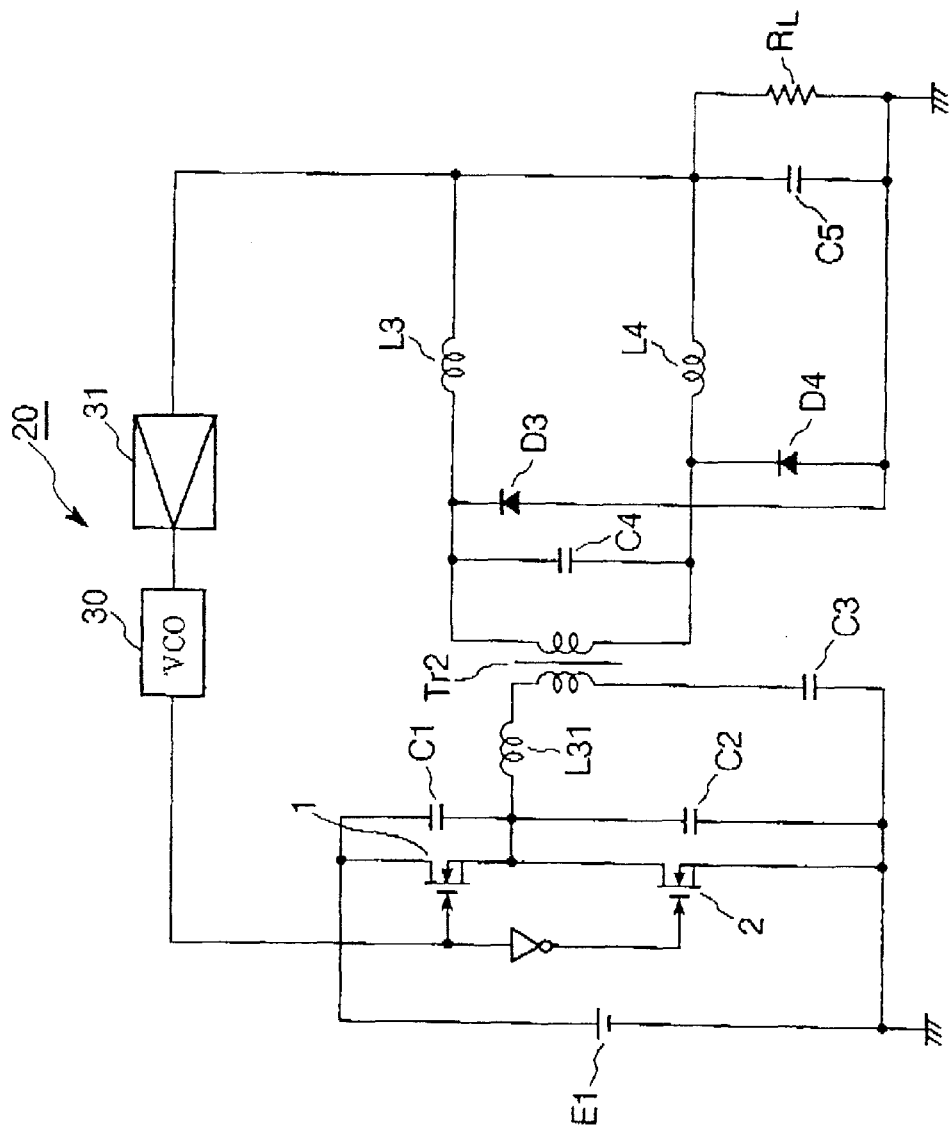
FIG. 7 is a circuit diagram of a modification of the resonant power converter shown in FIG. 1.

Next, FIG. 7 is a circuit diagram showing a modified structure of the resonant power converter 10 described above. In comparison with the resonant power converter 10 shown in FIG. 1, the resonant power converter 20 shown in FIG. 7 has an ideal transformer Tr2 (i.e., a transformer which does not have leakage inductance) in place of the transformer Tr1 which has leakage inductance, and the primary winding of this ideal transformer Tr2 is connected to a resonance coil L31. Further, because the equivalent circuit for this structure is the same as the circuit shown in FIGS. 2 to 4 (in which the combined inductance of the inductances L11 and L12 correspond to the inductance of the resonance coil L31), a current flowing through the secondary side of the transformer Tr2 can be made series resonance between the resonance coil L31 and the resonance capacitor C4. Accordingly, this structure also makes it possible to achieve the same results as those described above for the structure shown in FIG. 1.

Now, in the embodiment and its modification described above, two MOS-FETs 1, 2 are used as switching means, and a half bridge circuit is used, but it should be noted that the present invention is not limited to such structure, and it is possible to use other elements such as an IGBT as switching means. Further, it is also possible to use four switching means to form a full bridge circuit.

Hereinbelow, a description will be made with regard to the second embodiment of the present invention based on FIG. 8 to FIG. 15. In this connection, it is to be noted that the same or corresponding components or parts as those of the first embodiment are designated with the same reference numerals.

Figure 8:
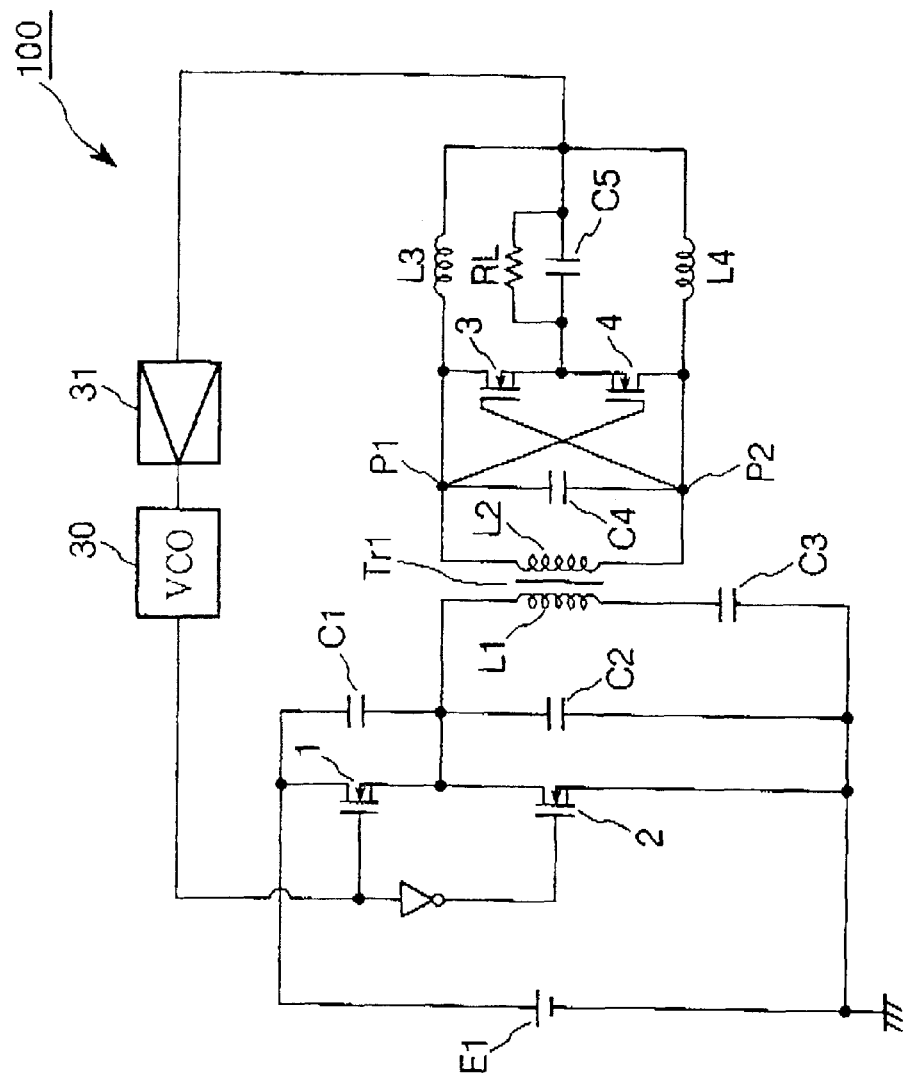
FIG. 8 is a circuit diagram of a second embodiment of the resonant power converter according to the present invention.

FIG. 8 is a circuit diagram which shows the second embodiment of the resonant power converter of the present invention. As is the same with the first embodiment shown in FIG. 1, the resonant power converter 100 is equipped with a DC power source E1, two MOS-FETs 1, 2 (switching means) connected in series with respect to the DC power source E1, a voltage controlled oscillator (hereinafter, referred to as a VCO) 30 for controlling the frequency of the driving signals supplied to the MOS-FETs 1, 2, a capacitor C1 connected in parallel with the MOS-FET 1, a capacitor C2 connected in parallel with the MOS-FET 2, and a transformer (resonance transformer) Tr1 which includes a primary coil (winding) L1 and a secondary coil (winding) L2. In this arrangement, one end of the primary coil L1 of the transformer Tr1 is connected to the junction between the MOS-FETs 1, 2, and the other end is connected to the negative side of the DC power source E1 via a capacitor C3.

In the secondary side of the circuit, a resonance capacitor C4 is coupled to the both ends of the secondary coil L2 of the transformer Tr1 so as to form parallel connection with respect to the secondary coil L2. Further, a pair of MOS-FETs for synchronous rectification (switching means for synchronous rectification) 3, 4 which are serially connected with each other are also connected to the both ends of the secondary coil L2. Furthermore, a pair of choke coils L3 and L4 which are serially connected are also connected to the both ends of the secondary coil L2. In addition, a capacitor C5 is arranged between the junction between the MOS-FETs 3, 4 and the junction between the choke coils L12, L3. The opposite ends of the capacitor C5 form output terminals for connection with a load RL.

Moreover, one end P1 of the resonance capacitor C4 is connected to a gate of the MOS-FET 4 and the other end P2 of the resonance capacitor C5 is connected to a gate of the MOS-FET 3 for providing drive signals for synchronous rectification.

An output voltage (a voltage applied to the load RL) is also supplied to a VOC 30 via an amplifier 7. The VCO 30 turns the two MOS-PETs 1, 2 ON and OFF by means of drive signals adjustably outputted with the same frequency as or a higher frequency than the resonance frequency of a resonance circuit constituted from leakage inductances (L11, L12) and the resonance capacitor (C4) described below. The frequency is adjusted in response to the voltage to be applied to the load RL to regulate an output voltage.

In this regard, it is to be noted that the circuit shown in FIG. 8 can be represented with the same equivalent circuit as that of the circuit 1 shown in FIG. 1. Therefore, the operations of the circuit (that is, a portion of the circuit in the left side of the capacitor C4) shown in FIG. 8 can be represented by the equivalent circuit shown in FIG. 2 to FIG. 4 described above, and the timing chart shown in FIG. 5 is also applicable to this circuit configuration. Accordingly, as see from FIG. 5, a voltage in the form of the sinusoidal waveform is generated across the resonance capacitor C4, and in this embodiment the voltage is utilized as drive signals for the MOS-FETs 3, 4 for synchronous rectification.

Figure 9:
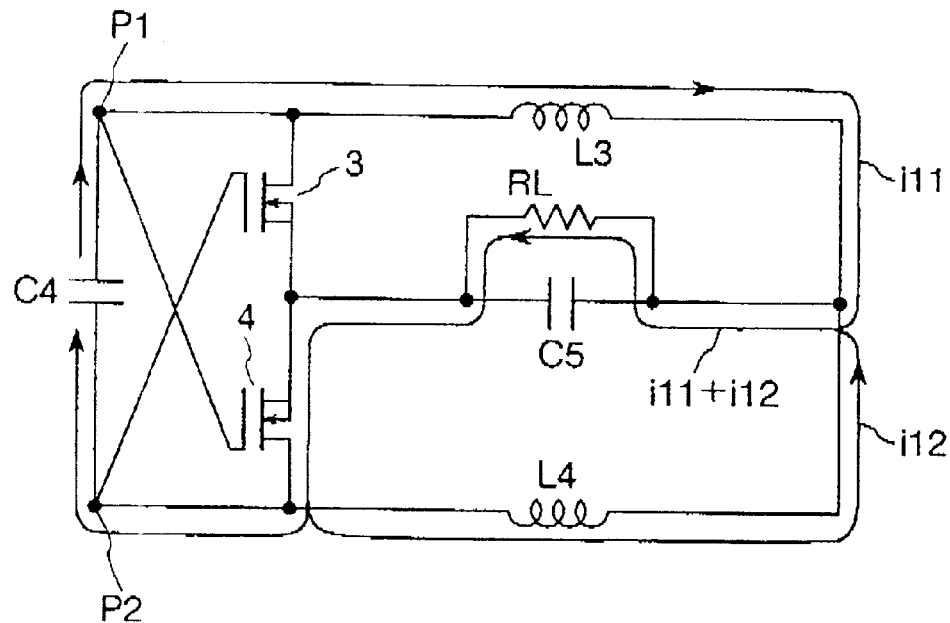
FIG. 9 is a circuit diagram which shows the flow of the current in a current doubler circuit of the second embodiment when one end P1 of the resonance capacitor C4 is positive voltage.
Figure 10:
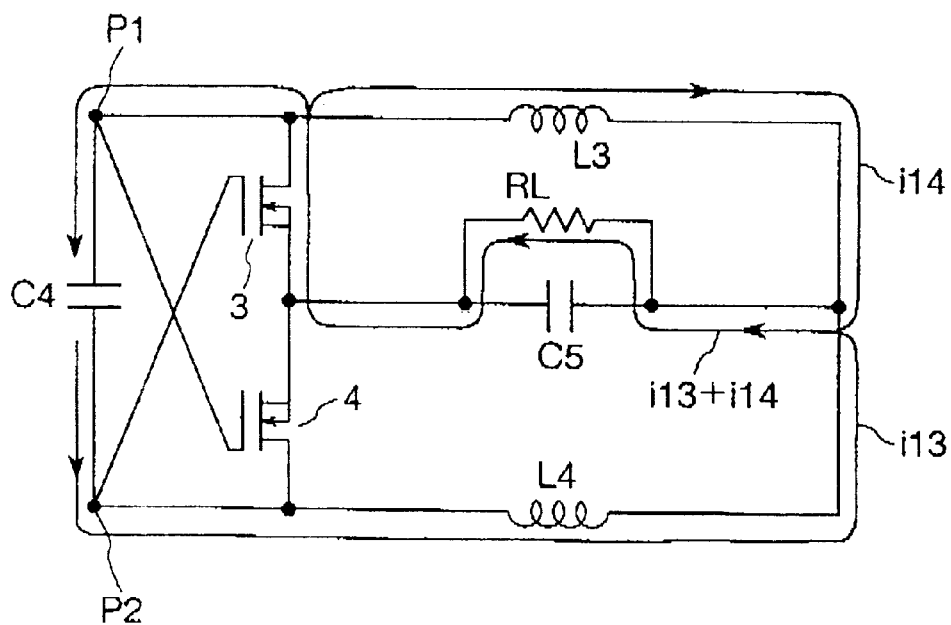
FIG. 10 is a circuit diagram which shows the flow of the current in the current doubler circuit when the other end P2 of the resonance capacitor C4 is positive voltage.
Figure 11:
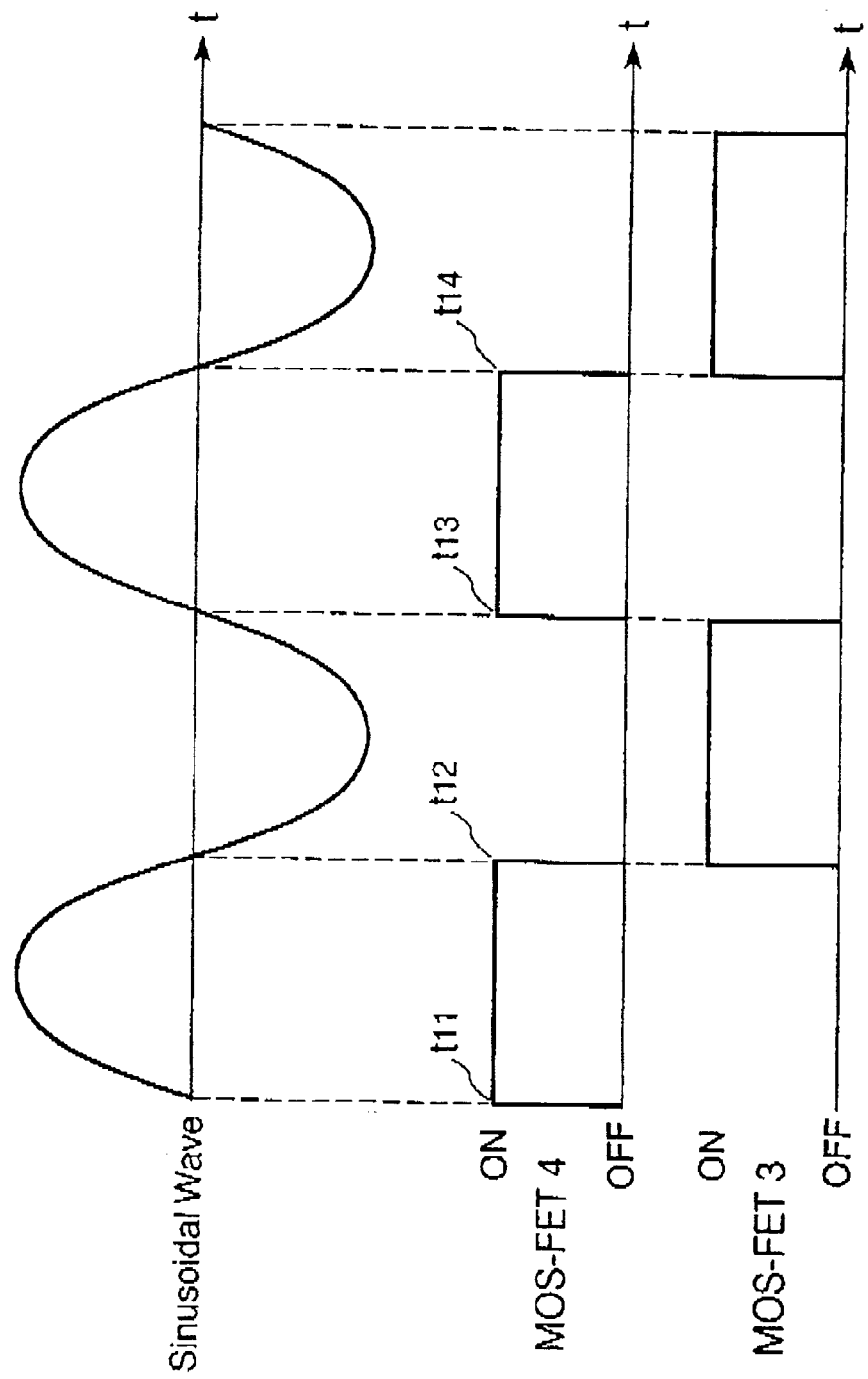
FIG. 11 is a timing chart which shows voltages in the form of sinusoidal wave which are generated across the resonance capacitor C4 and the timings of ON and OFF of each of the MOS-FETs 3 and 4.

FIG. 9 and FIG. 10 respectively show the operations of the doubler current rectification circuit of this embodiment, and FIG. 11 is a timing chart which shows ON/OFF states of the MOS-FETs 3, 4 and the sinusoidal waveform voltage generated across the resonance capacitor C4. Hereinbelow, the operations of a portion of the circuit in the right side of the capacitor C4 will be explained with reference to these drawings.

When the voltage at one end P1 of the resonance capacitor C4 is a positive voltage, a drive signal is supplied to the gate of the MOS-FET 4 within the time interval between time t11 and time t12 (corresponding to a half-wave part of the sinusoidal waveform voltage), the MOS-FET 4 is turned on (at this time, MOS-FET 3 is in an off state). As a result, as shown in FIG. 9, a current i11 flows via the choke coil L3, the load RL (capacitor C5) and the MOS-FET 4, and a loop current i12 also flows via the capacitor C5, the MOS-FET 4 and the choke coil 4. Therefore, an added (combined) current (i11+i12) flows through the load RL, so that the current value becomes double to achieve a doubler current.

At this time, since a voltage drop in the current flowing through the MOS-FET 4 is very small, it is possible to reduce switching loss. Further, since the current i11 and the current i12 have symmetrical waveforms with each other, the added current (i11+i12) generates a flat direct voltage. That is, zero ripple can be achieved. In this way, the capacity of the output capacitor C5 can be made small.

Further, when the other end P2 of the resonance capacitor C4 is a positive voltage, a drive signal is supplied to the gate of the MOS-FET 3 within the time interval between time t12 and time t13, as shown in FIG. 11, so that the MOS-FET 3 is turned on (at this time, the MOS-FET 4 is in OFF state). As a result, as shown in FIG. 10, a current i13 flows via the choke coil L4, the load RL (capacitor C5) and the MOS-FET 3, while a loop current i14 flows via the capacitor C5, the MOS-FET 3, and the choke coil L3. As a result, an added (combined) current (i13+i14) flows through the load RL, the current value becomes double. At this time, since a voltage drop in the current flowing through the MOS-FET 3 is very small, it is possible to reduce switching loss.

As described above, in the resonant power converter 100 using the synchronous rectification according to this embodiment, the resonance capacitor C4 is arranged at the secondary side of the transformer Tr1 (that is, the resonance capacitor C4 is connected in parallel with the secondary coil L2 of the transformer Tr1) so that a resonance current is generated by using the resonance phenomenon occurring between the resonance capacitor C4 and the leakage inductances (L11, L12) of the transformer Tr1. Further, since the MOS-FETs 3, 4 are driven using the sinusoidal voltage waveform generated across the capacitor C4 to perform synchronous rectification, the current flowing through the secondary side of the transformer Tr1 can be rectified without providing a separate drive circuit.

In this regard, it is to be noted that since the MOS-FETs 3, 4 have a smaller switching resistance and therefore a voltage drop is small, it is possible to improve conversion efficiency of the power converter drastically. Further, since zero ripple is achieved, a capacity of the output capacitor can be made small.

Figure 12:
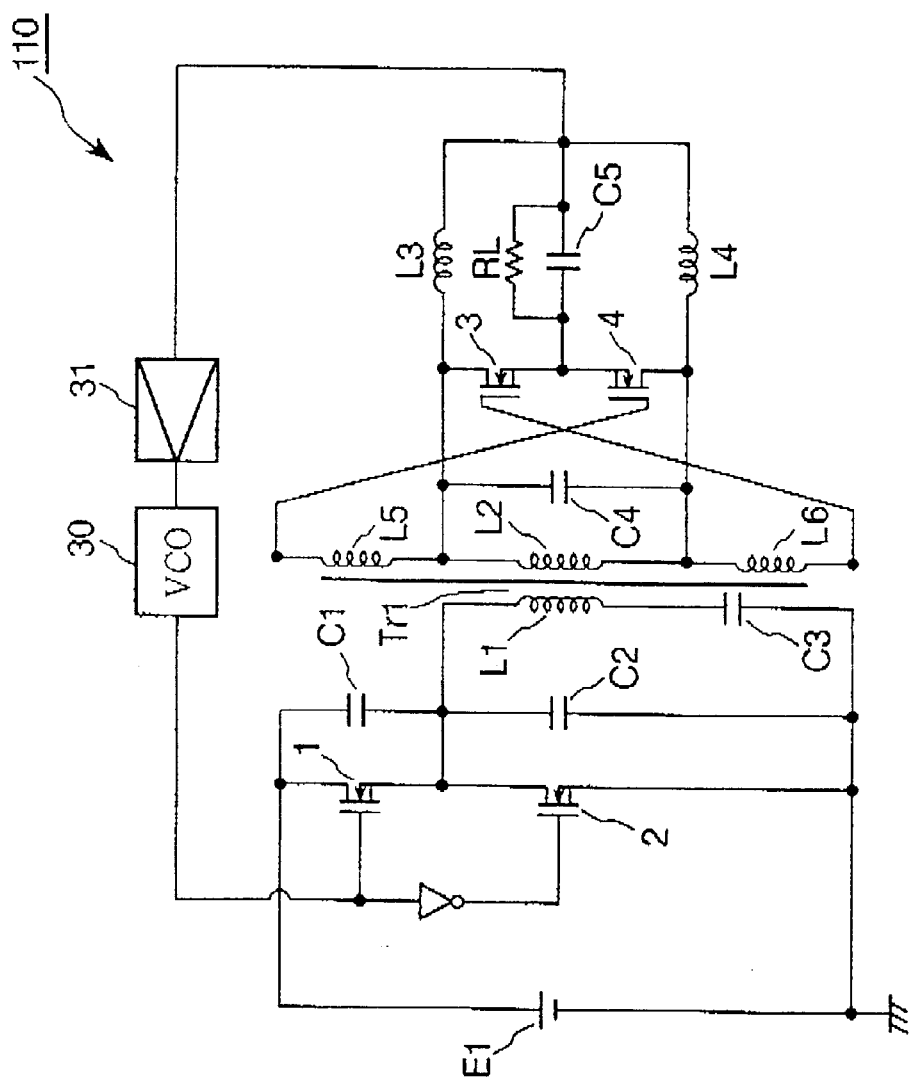
FIG. 12 is a circuit diagram which shows a first modification of the second embodiment of the present invention.

FIG. 12 is a circuit diagram which shows a circuit configuration of a resonant power converter 110 using synchronous rectification which is a first modification of the resonant power converter 100 of the second embodiment. As shown in this figure, in this modification a pair of auxiliary coils (windings) L5, L6 are respectively connected to the both ends of the secondary coil L2 of the transformer (resonant transformer) Tr1, and voltage signals generated at each of the ends of these coils which are opposite to their connecting ends to the secondary coil L2 are supplied to the gates of the MOS-FETs 3, 4, respectively. Since other structure of the circuit is the same as that of the circuit shown in FIG. 8, a detailed description thereof has been omitted.

According to the circuit configuration of this first modification, the voltage generated across the opposite ends of the two auxiliary coils L5, L6 corresponds to a voltage which is obtained by amplifying the voltage generated across the resonance capacitor C4. Therefore, by using this voltage, it is also possible to drive the MOS-FETs 3, 4 reliably even in the case where the voltage value generated across the capacitor C4 is small.

Figure 13:
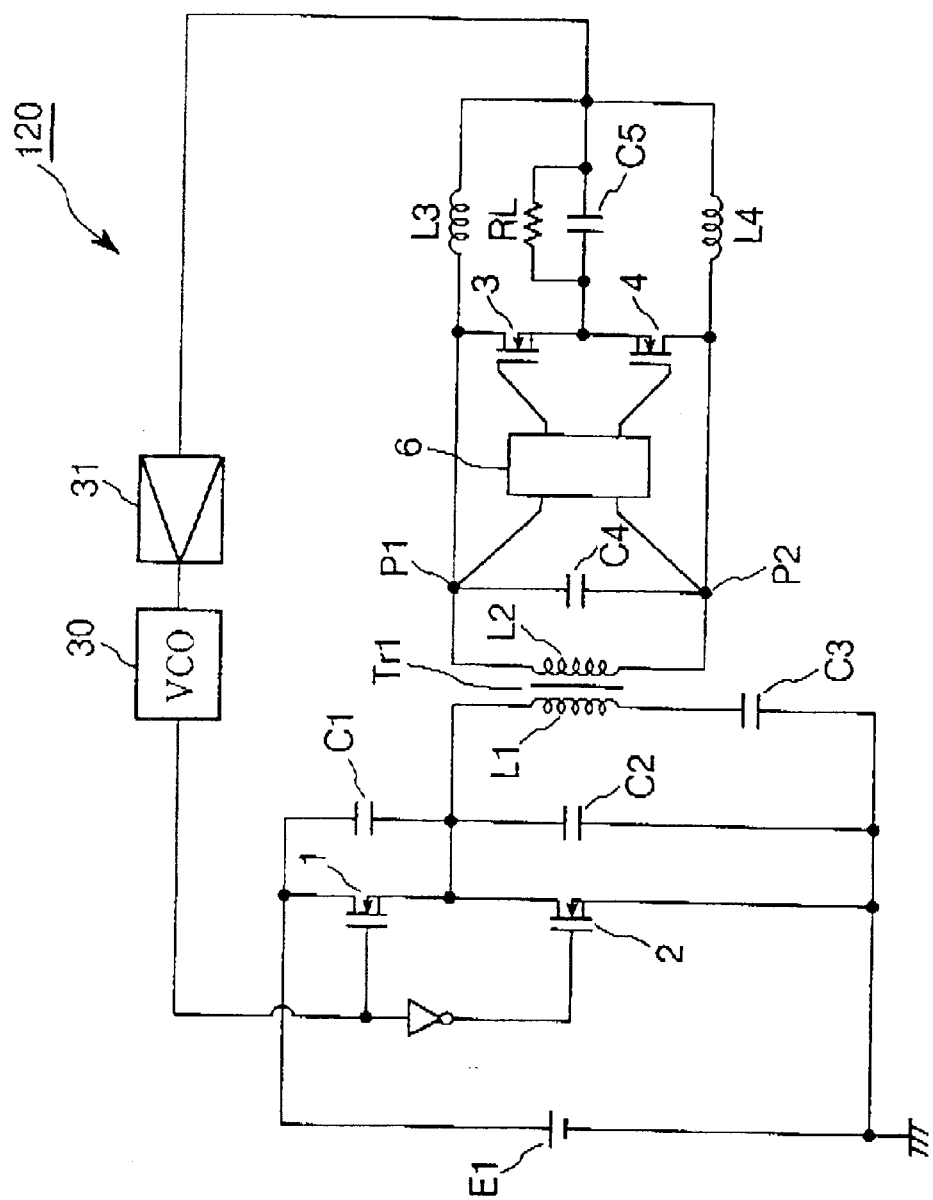
FIG. 13 is a second modification of the second embodiment of the present invention.

FIG. 13 is a circuit diagram which shows a resonant power converter 120 using synchronous rectification which is a second modification of the resonant power converter 100 of the second embodiment shown in FIG. 8. As shown in this figure, in this second modification, the both ends of the resonance capacitor C4 are connected to a waveform processing circuit (waveform processing means) 6, and other structure is the same as that of the circuit shown in FIG. 8. In this regard, FIG. 14 is a timing chart which shows a waveform of an input voltage and a waveform of an output voltage to and from the waveform processing circuit 6.

The waveform processing circuit 6 has a comparing means which compares the sinusoidal voltage obtained across the capacitor C4 with a predetermined reference voltage $V_{ref}$. When the obtained voltage value is higher than the reference voltage $V_{ref}$, a high level signal "H" is outputted, while when the obtained voltage value is lower than the reference voltage $V_{ref}$, a low level signal "L" is outputted.

Figure 14:
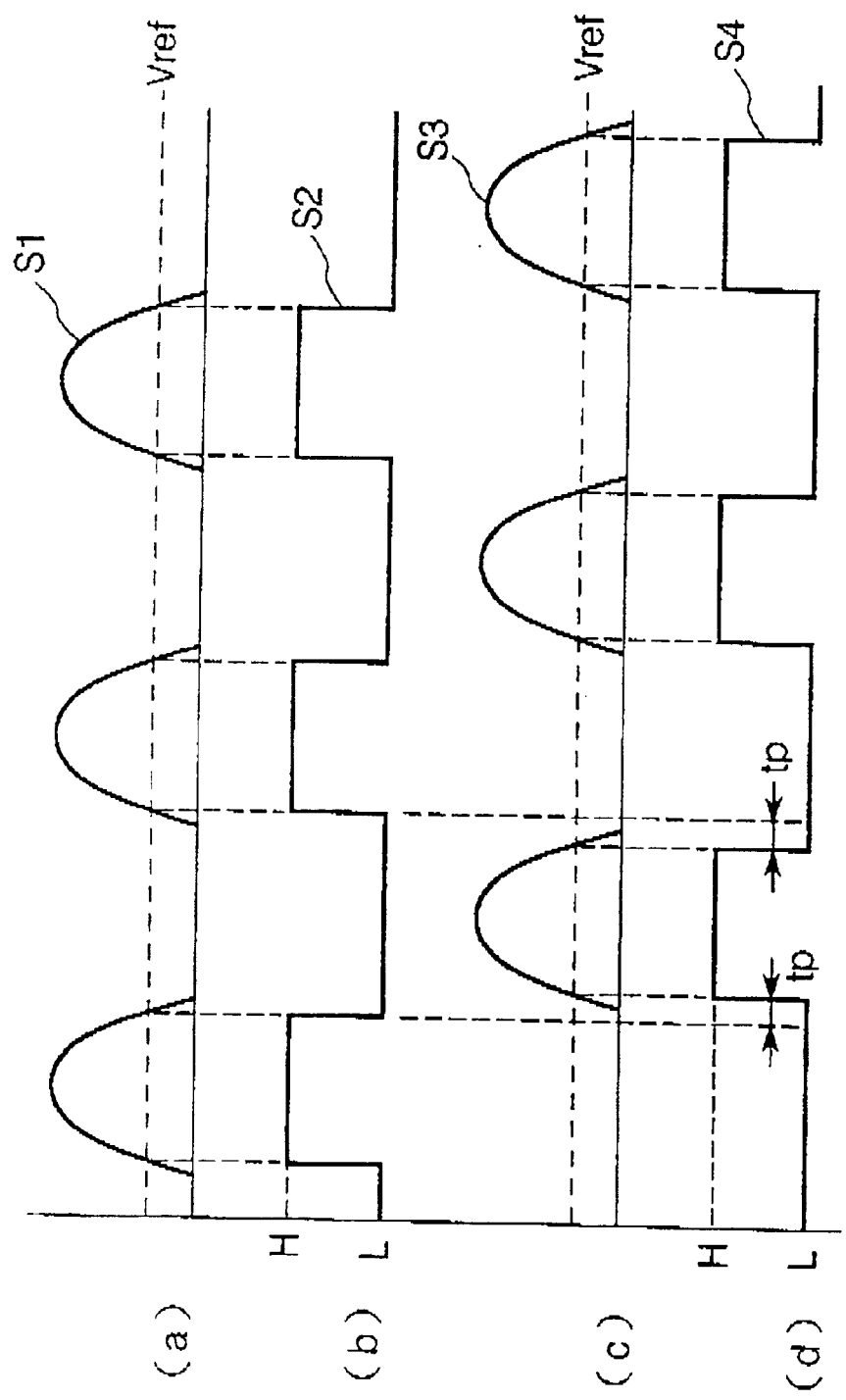
FIG. 14 is a timing chart which shows pulse voltages generated in the waveform processing circuit of the second modification.

Specifically, as shown in the timing chart (a) of FIG. 14, the voltage signal S1 obtained at one end P1 of the capacitor C4 is compared with the reference voltage $V_{ref}$ and thereby a high level pulse signal "H" is obtained when the equation S1>$V_{ref}$ is satisfied. With this result, as shown in (b) of the figure, a voltage signal 52 in the form of a pulse wave is obtained. In this pulse wave S2, each pulse has a leading edge which is raised slightly later than the leading edge of the voltage signal S1 and a trailing edge which is lowered slightly earlier than the trailing edge of the voltage signal S1. The MOS-FET 4 is driven by this voltage signal S2.

As is the same with the above, the voltage signal S3 (see FIG. 13(c) obtained at the other end P2 of the capacitor C4 is compared with the reference voltage $V_{ref}$ and thereby a high level signal "H" is obtained when the equation S3>$V_{ref}$ is satisfied. With this result, as shown in (d) of the figure, a voltage signal S4 in the form of a pulse wave is obtained. In this pulse wave S4, each pulse has a leading edge which is raised slightly later than the leading edge of the voltage signal S3 and a trailing edge which is lowered slightly earlier than the trailing edge of the voltage signal S3. The MOS-FET 3 is driven by this voltage signal S4.

As described above, since the pulse signal S4 for driving the MOS-FET 3 is raised at a point time tp slightly after S2 has become zero ("L" level) and the pulse signal S2 for driving the MOS-FET 4 is raised at a point of time tp slightly after S2 has become zero ("L" level), it is possible to avoid the case where the two MOS-FETs 3, 4 are turned on at the same time, thus enabling to prevent generation of cross-conduction.

Further, a MOS-FET needs a high gate voltage for turning it on. Therefore, if such MOS-FET is used as a switching element, it is possible to obtain the result as shown in FIG. 14.

Figure 15:
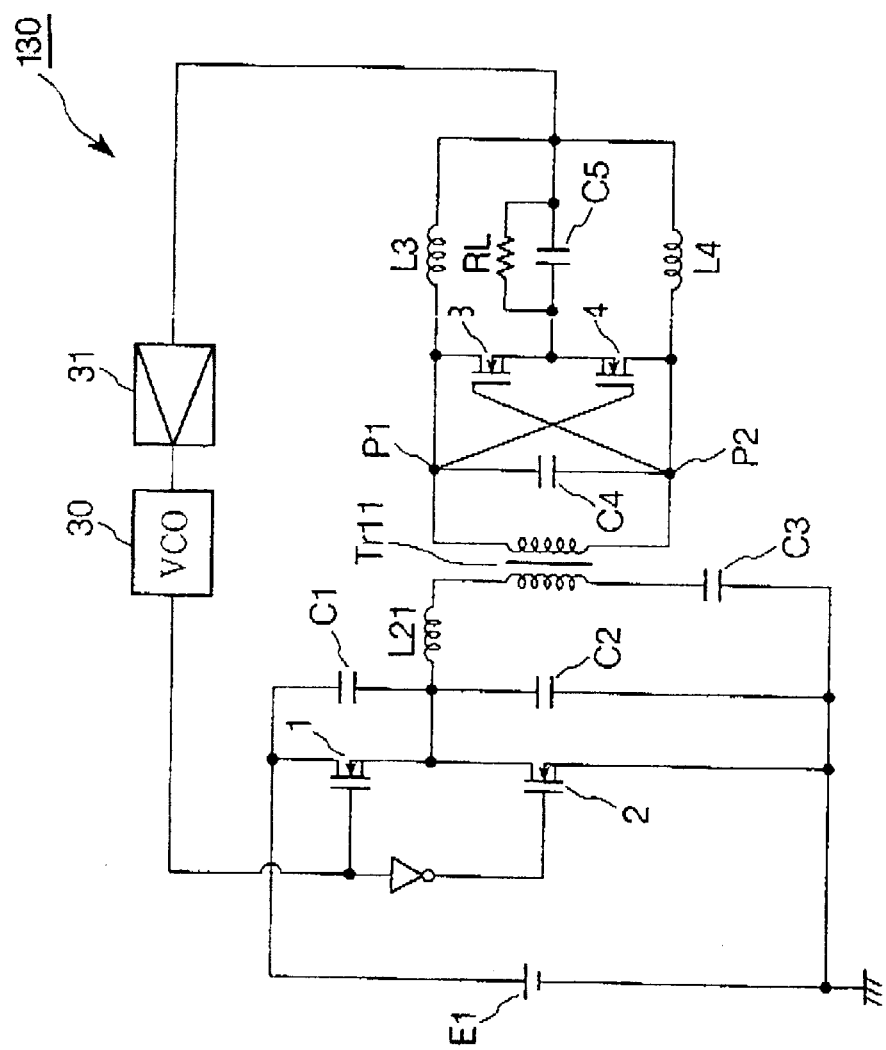
FIG. 15 is a circuit diagram which shows a third modification of the second embodiment of the present invention.
Figure 16:
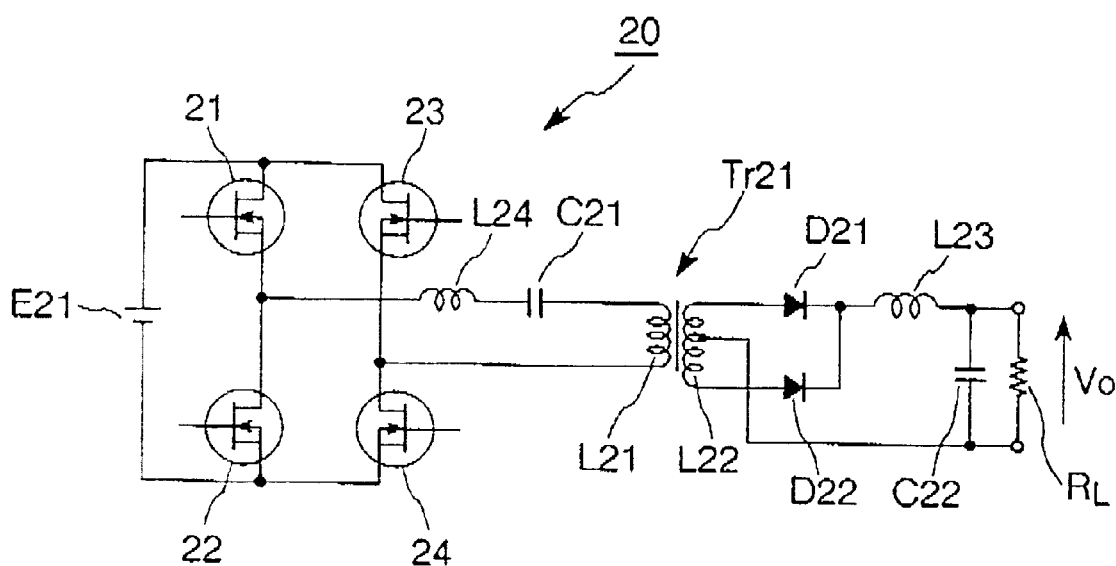
FIG. 16 is a circuit diagram of the prior art resonant power converter.

FIG. 15 is a circuit diagram which shows a resonant power converter 130 using synchronous rectification which is a third modification of the resonant power converter 100 of the first embodiment shown in FIG. 8. As shown in this figure, this resonant power converter 130 is composed of an ideal transformer Tr11 (a transformer having no leakage inductance) and a resonant coil L21 which is connected to a primary coil of the ideal transformer Tr11. Other structure of this circuit is the same as that of the circuit shown in FIG. 8. While the circuit configuration shown in FIG. 8 has the structure in which a current flowing through the secondary side of the transformer Tr1 performs series resonance between the leakage inductance of the transformer Tr1 and the resonance capacitor C4, the circuit configuration shown in FIG. 15 has a structure in which a current flowing through the secondary side of the transformer Tr1 performs series resonance between the resonance coil L21 and the resonance capacitor C4. Since an equivalent circuit of this circuit configuration is the same as that shown in FIGS. 2 to 4, the same results as those described above with reference to the second embodiment and its modifications can be obtained.

In the above embodiment and modifications thereof, MOS-FETs 3, 4 are used as switching elements for synchronous rectification, the present invention is not limited thereto, and it is also possible to use transistors or thyristors other than MOS-FETs.

Further, although the first modification of the second embodiment shown in FIG. 12 uses the auxiliary coils L5, L6 and the second modification shown in FIG. 13 uses the waveform processing circuit 6, it is possible to use combination of these coils L5, L6 and the waveform processing circuit 6. That is, the present invention includes the case that such auxiliary coils L5, L6 and the waveform processing circuit 6 are incorporated into a single circuit.

As described above, according to the second embodiment of the present invention, since the voltage signal in the form of sinusoidal wave generated across the resonance capacitor arranged at the secondary side of the transformer is used to drive the switching elements for synchronous rectification to rectify the current flowing the doubler current circuit at the secondary side of the circuit, a voltage drop can be drastically reduced as compared with the conventional circuit using diodes and thereby it is possible to improve the conversion efficiency of the power converter remarkably. Further, there is no need to provide a separate drive circuit for driving the switching elements, the circuit configuration can be made simple and therefore manufacturing cost can be lowered.

Further, in the case where the two auxiliary coils are respectively connected to the opposite ends of the secondary coil as the second modification, the voltage generated across the resonance capacitor can be amplified. Therefore, even in the case where the voltage across the capacitor is small, it is possible to drive the switching elements for synchronous rectification reliably.

Furthermore, in the case where the waveform processing means is arranged at the subsequent stage of the resonance capacitor to produce pulse wave for driving the two switching elements for synchronous rectification by using the waveform processing means as the second modification, a very short delay is produced between the OFF-timing of one switching element and the ON-timing of the other switching element, so that it is possible to reliably turn on the other switching element after the one switching element has been turned off, thus resulting in reducing generation of cross-conduction.

Finally, it is also to be noted that the present invention is not limited to the embodiments and modifications thereof as described above, and many changes and additions may be made without departing from the scope of the present invention which will be determined by the following claims.

What is claimed is:

1. A resonant power converter having a primary side and a secondary side, comprising:
   an input power source provided in the primary side;
   switching means connected to the input power source;
   a resonant transformer having a primary coil and a second coil; and
   a resonance capacitor which is provided in the secondary side and is connected in parallel to the secondary coil of the resonant transformer so that series resonance occurs in a current flowing through the secondary side of the power converter throughout a switching period.

2. The resonant power converter as claimed in claim 1, wherein the resonant transformer is constructed from an ideal transformer and a resonant coil arranged in the primary side of the ideal transformer, so that the series resonance occurs between the resonant coil and the resonance capacitor.

3. The resonant power converter as claimed in claim 1, wherein the resonant transformer has a leakage inductance, and the series resonance of the current occurs between the leakage inductance and the resonance capacitor.

4. The resonant power converter as claimed in claim 1, further comprises a current doubler circuit for making the current flowing through the secondary side double, said current doubler circuit being provided in the secondary side and coupled to the both ends of the resonance capacitor.

5. The resonant power converter as claimed in claim 4, wherein the current doubler circuit includes a pair of circuits each having a rectifying means and an inductance, in which these circuits are connected in parallel with each other so that a junction between the rectifying mean and inductance of one circuit and a junction between the rectifying means and inductance of the other circuit are respectively connected to the both ends of the secondary coil.

6. The resonant power converter as claimed in claim 1, wherein the switching means is formed into a bridge type comprised of two MOS-FETs.

7. The resonant power converter as claimed in claim 1, further comprises means for performing synchronous rectification for the current flowing the secondary side, said means including switching elements provided in the secondary side so as to be driven by drive signals responsive to the voltage generated across the resonance capacitor and having a sinusoidal waveform.

8. The resonant power converter as claimed in claim 1, wherein said switching means includes a pair of switching elements for synchronous rectification, and these switching elements are driven by drive signals.

9. The resonant power converter as claimed in claim 8, further comprises a pair of auxiliary coils which are connected to the both ends of the secondary coil, respectively, and the drive signals are obtained from the opposite ends of the respective auxiliary coils which are not connected to the secondary coil.

10. The resonant power converter as claimed in claim 8, further comprises waveform processing means for producing pulse waves by processing and shaping the voltage drive signals to be supplied to the switching elements.

11. The resonant power converter as claimed in claim 10, wherein the waveform processing means compares the voltage drive signals in the form of sinusoidal wave with a predetermined reference value to produce plus signals.

12. The resonant power converter as claimed in claim 8, wherein the resonant transformer is composed of an ideal transformer and a resonant coil connected to the primary coil of the transformer, in which the series resonance occurs between the resonant coil and the resonance capacitor.

13. The resonant power converter as claimed in claim 8, wherein each of the switching elements includes a MOS-FET.

14. A resonant power converter having a primary side and a secondary side, comprising:

an input power source provided in the primary side;

switching means connected to the input power source;

a resonant transformer having a primary coil and a second coil;

a resonance capacitor which is provided in the secondary side and is connected in parallel to the secondary coil of the resonant transformer so that series resonance occurs in a current flowing through the secondary side of tie power converter; and a current doubler circuit for making the current flowing through the secondary side double, said current doubler circuit being provided in the secondary side and coupled to the both ends of the resonance capacitor;

the current doubler circuit including a pair of circuits each having a rectifying means and an inductance, in which these circuits are connected in parallel with each other so that a junction between the rectifying means and inductance of one circuit and a junction between the rectifying means and inductance of the other circuit are respectively connected to the both ends of the secondary coil.

15. A resonant power converter having a primary side and a secondary side, comprising:

an input power source provided in the primary side;

switching means connected to the input power source;

a resonant transformer having a primary coil and a second coil; and a resonance capacitor which is provided in the secondary side and is connected in parallel to the secondary coil of the resonant transformer so that series resonance occurs in a current flowing through the secondary side of the power converter;

said switching means including a pair of switching elements for synchronous rectification, the switching elements being driven by drive signals responsive to the voltage generated across the resonance capacitor and having a sinusoidal waveform; and a pair of auxiliary coils connected to both ends of the secondary coil, respectively, the drive signals being obtained from the opposite ends of the respective auxiliary coils which are not connected to the secondary coil.

16. A resonant power converter having a primary side and a secondary side, comprising:

an input power source provided in the side;

switching means connected to the input power source;

a resonant transformer having a primary coil and a second coil; and a resonance capacitor which is provided in the secondary side and is connected in parallel to the secondary coil of the resonant transformer so that series resonance occurs in a current flowing through the secondary side of the power converter;

said switching means including a pair of switching elements for synchronous rectification, the switching elements are driven by drive signals;

waveform processing means for producing pulse waves by processing and shaping the voltage drive signals to be supplied to the switching elements;

the waveform processing means comparing the voltage drive signals in the form of sinusoidal wave with a predetermined reference value to produce plus signals.

* * * * *

UNITED STATES PATENT AND TRADEMARK OFFICE
CERTIFICATE OF CORRECTION

PATENT NO. : 6,483,721 B2
DATED : November 19, 2002
INVENTOR(S) : Hiroto Terashi It is certified that error appears in the above-identified patent and that said Letters Patent is hereby corrected as shown below:

Title page,
Item [57], ABSTRACT,
Line 2, replace "MOS-PETs" with -- MOS-FETs --

Column 1,
Line 31, replace "with a D power" with -- with a DC power --
Line 47, replace "the MOS-PETs," with -- the MOS-FETs --
Line 57, replace "T21," should read -- Tr21, --

Column 2,
Line 10, replace "converter which is aL trend" with -- converter which is a trend --
Line 35, replace "source:" with -- source; --
Line 37, replace "the secondary aide and" with -- the secondary side and --
Line 39, replace "resonance occurs it a" with -- resonance occurs in a --

Column 4,
Line 14, replace "MOS-PET" with -- MOS-FET --
Line 50, replace "Detailed Description of Tee" with -- Detailed Description of the --
Line 62, replace "to-as" with -- to as --

Column 6,
Line 20, replace "if the NOS-FET" with -- if the MOS-FET --
Line 27, replace "MOS-FET2." with -- MOS-FET2, --

Column 7,
Line 59, replace "PC current" with -- DC current --

Column 8,
Line 67, replace "L12, L3" with -- L2, L3 --

Column 9,
Line 11, replace "MOS-PETs" with -- MOS-FETS --

Column 11,
Line 2, replace "signal 52" with -- signal S2 --
Lines 8-9, replace "(see FIG. 13 *(c)*" with -- (see FIG.13(c)) --

Column 13,
Line 1, replace "mean and inductance" with -- means and inductance --
Line 51, replace "of tie power" with -- of the power --

UNITED STATES PATENT AND TRADEMARK OFFICE
CERTIFICATE OF CORRECTION

PATENT NO. : 6,483,721 B2
DATED : November 19, 2002
INVENTOR(S) : Hiroto Terashi It is certified that error appears in the above-identified patent and that said Letters Patent is hereby corrected as shown below:

Column 14,
Line 35, replace "in the side" with -- in the primary side --

Signed and Sealed this

Twenty-third Day of September, 2003

JAMES E. ROGAN
*Director of the United States Patent and Trademark Office*